Oct. 10, 1939.　　　　　G. TODD　　　　　2,175,788
ELECTROPROCESSING MACHINE
Filed Feb. 21, 1938　　　　8 Sheets-Sheet 1
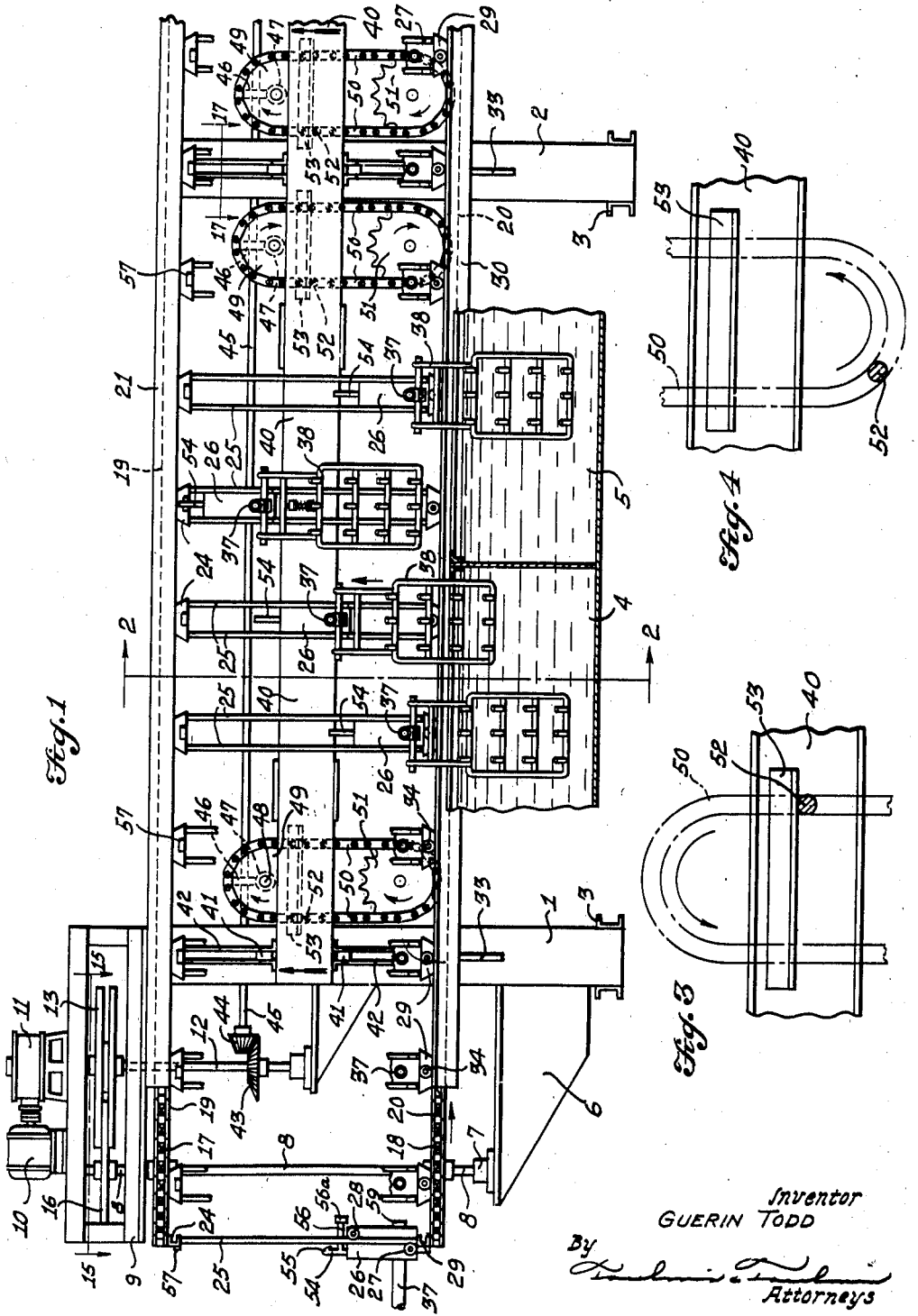
Inventor
GUERIN TODD
By
Attorneys

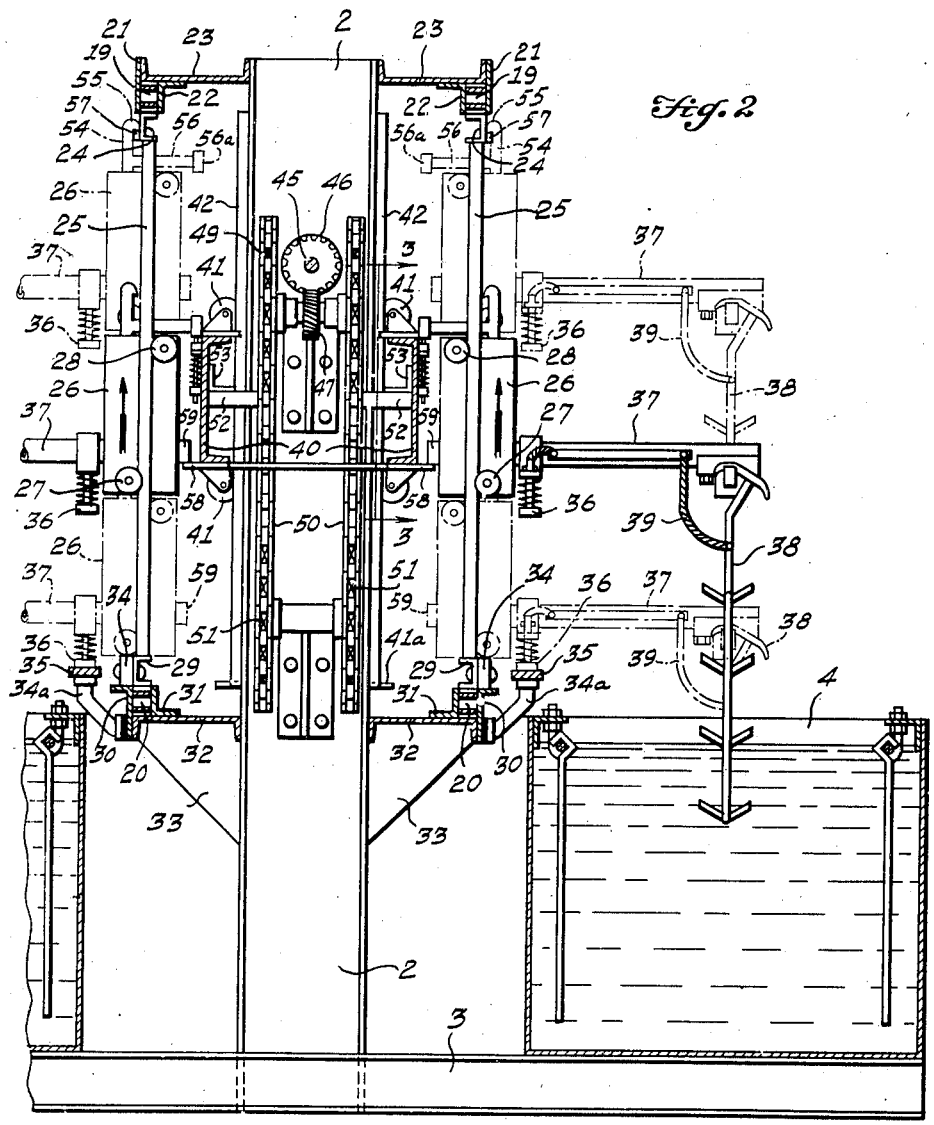

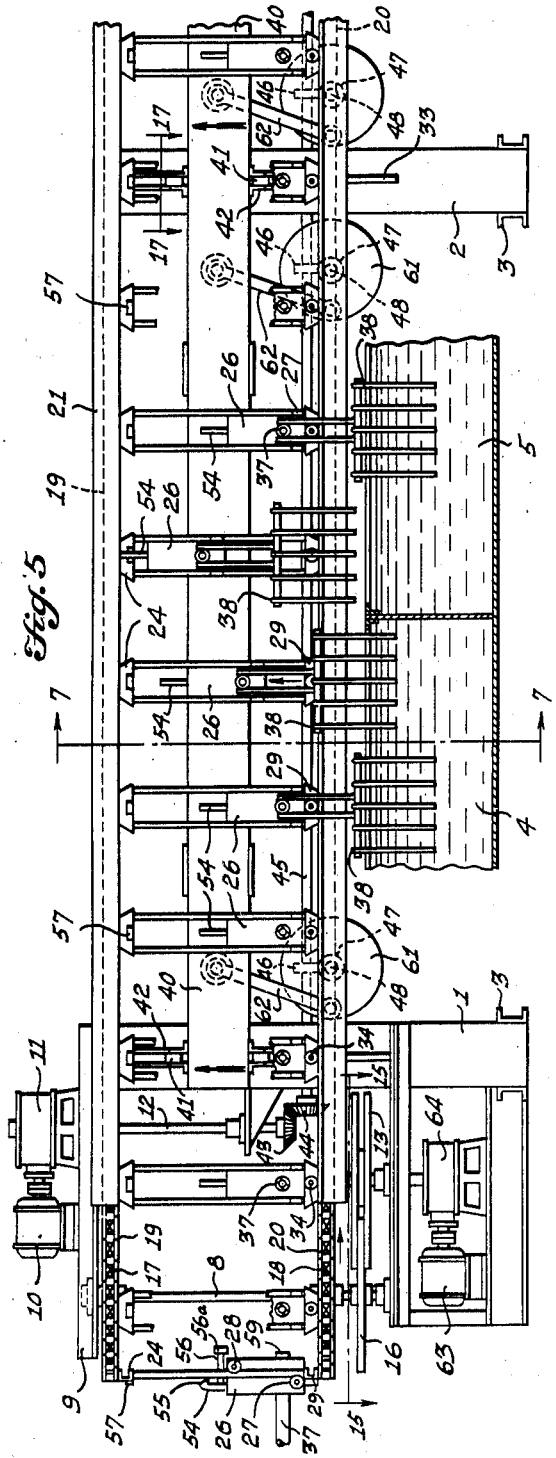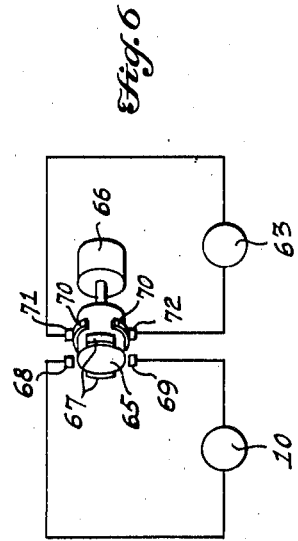

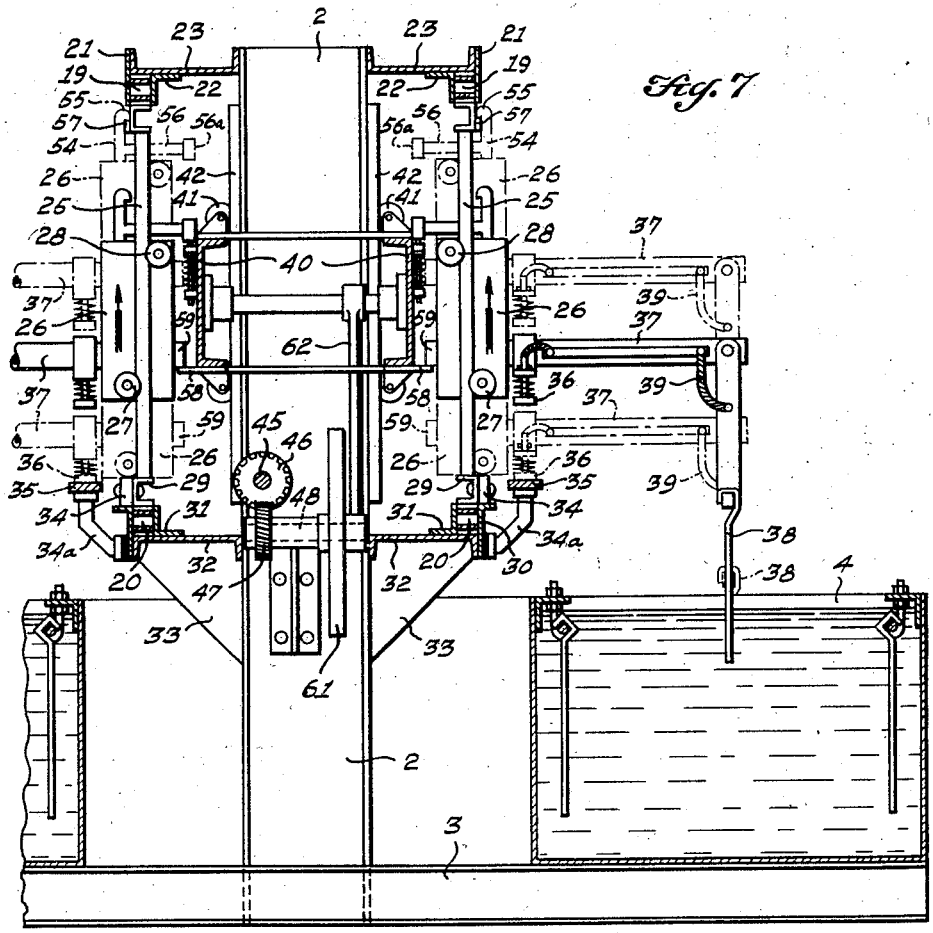

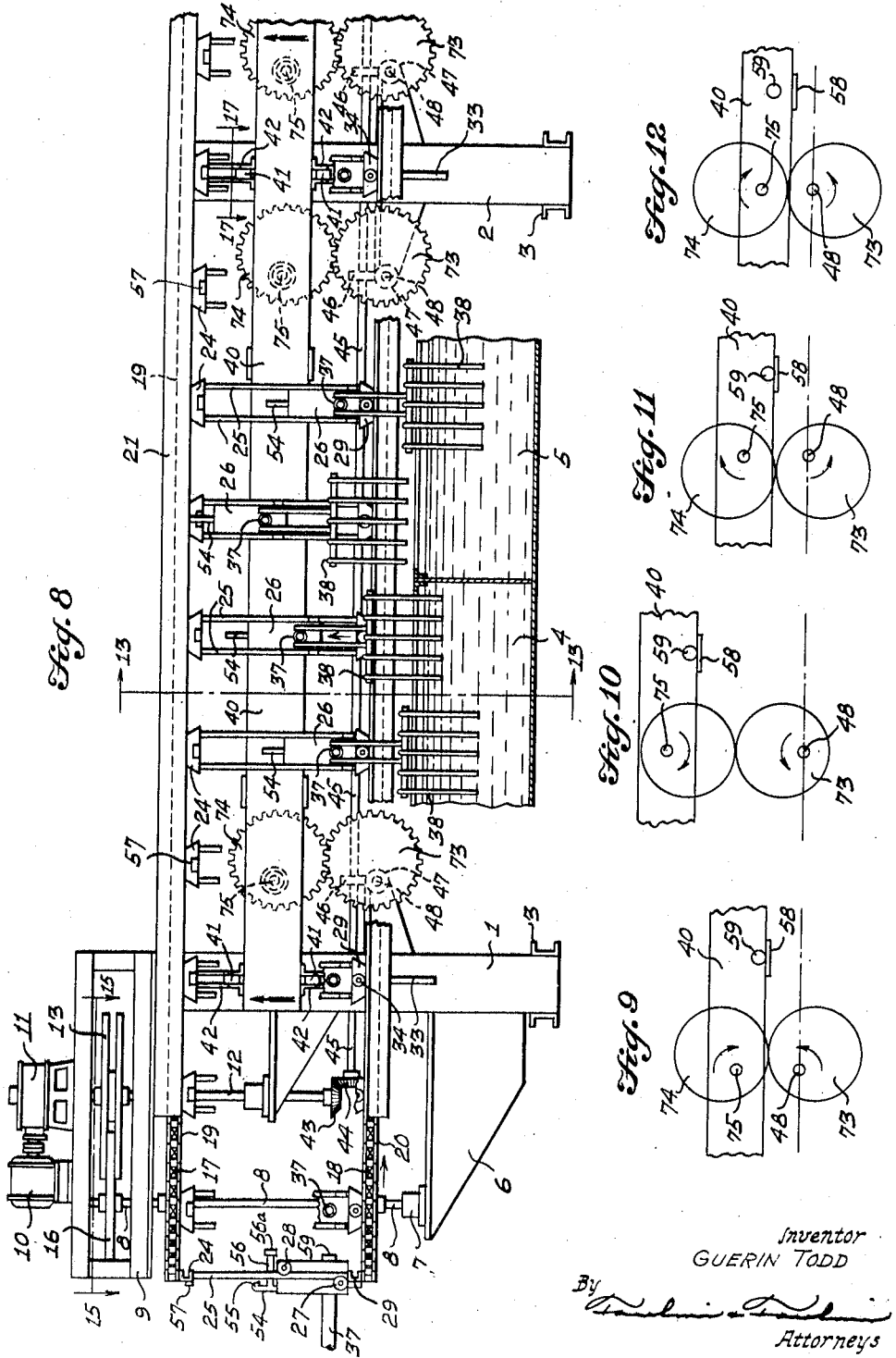

Oct. 10, 1939.  G. TODD  2,175,788
ELECTROPROCESSING MACHINE
Filed Feb. 21, 1938  8 Sheets-Sheet 6

Inventor
GUERIN TODD
By
Attorneys

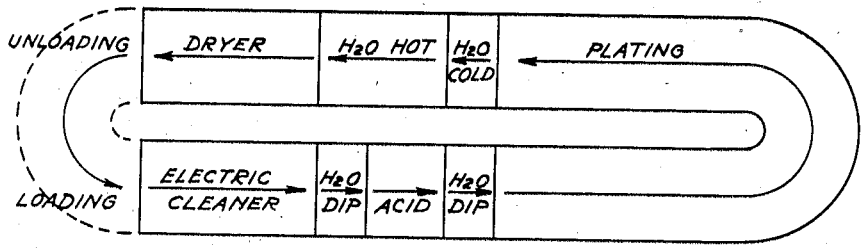
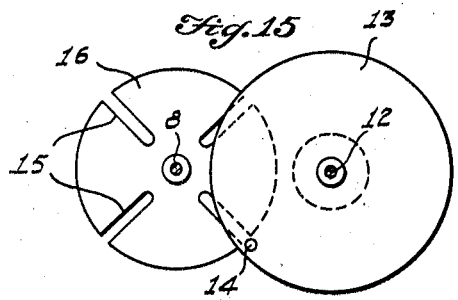
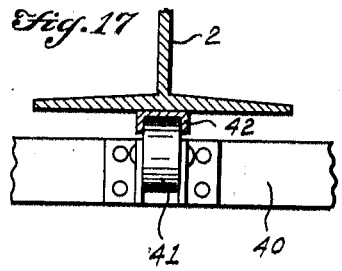
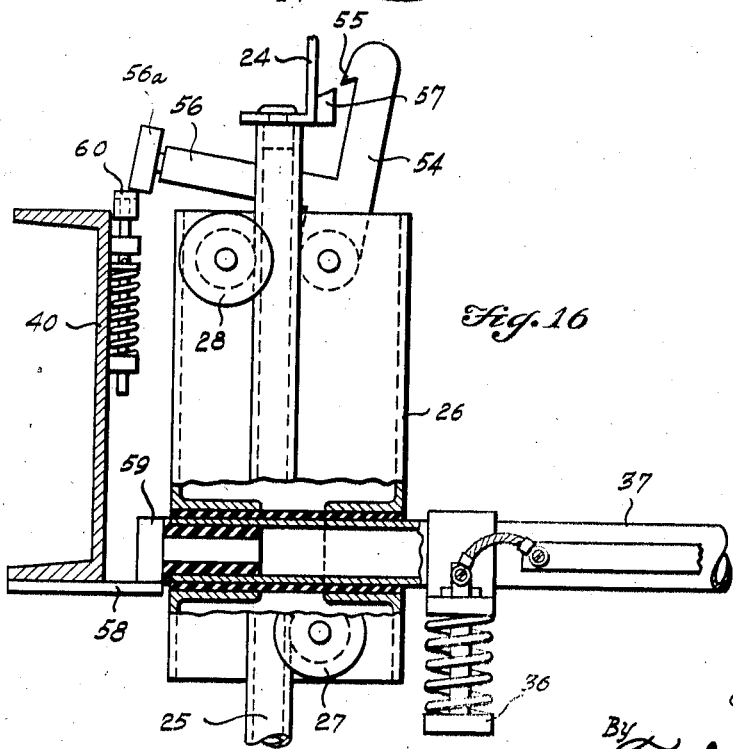

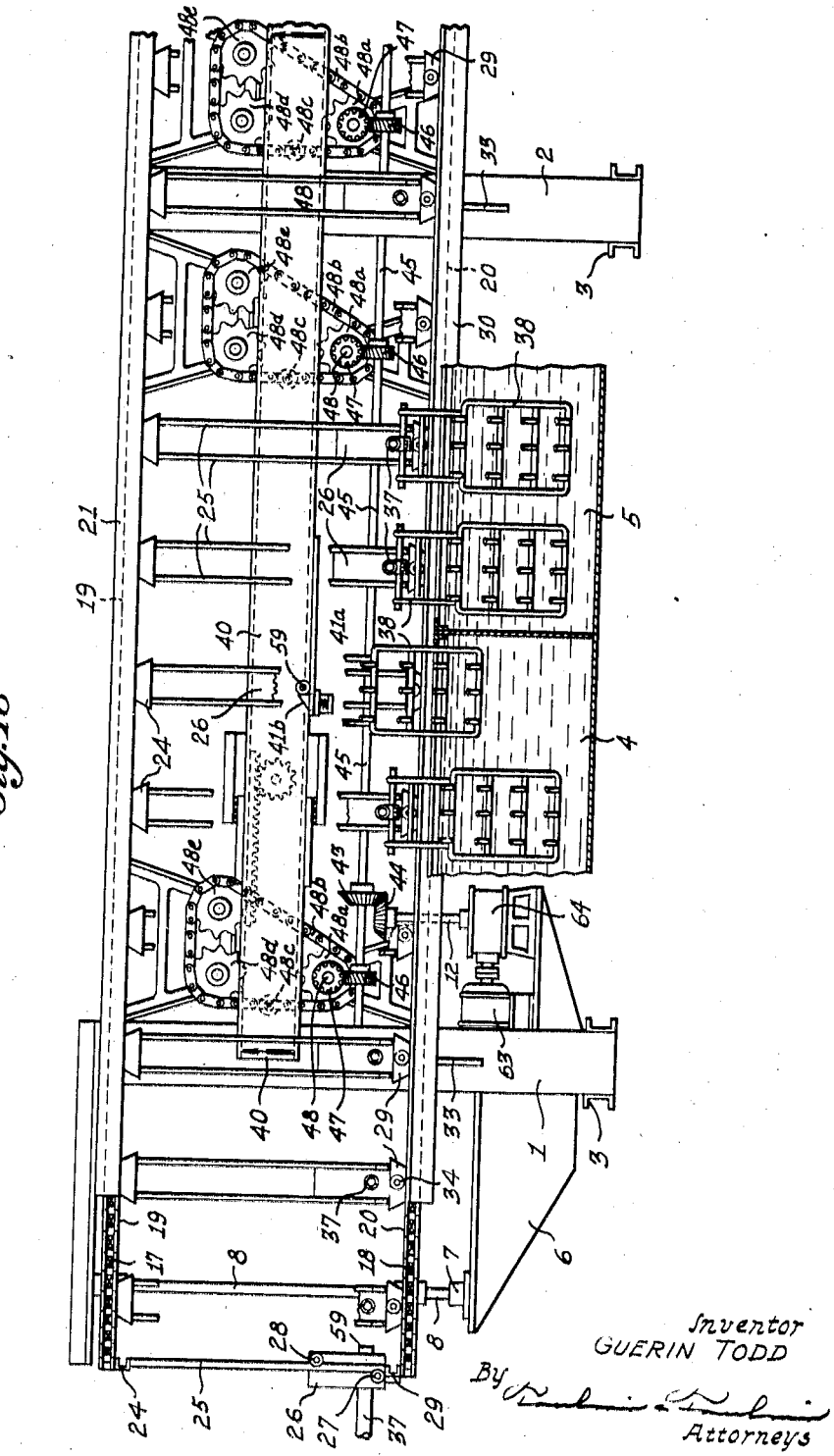

Patented Oct. 10, 1939

2,175,788

UNITED STATES PATENT OFFICE 2,175,788

ELECTROPROCESSING MACHINE

Guerin Todd, Shrewsbury, N. J., assignor to Hanson-Van Winkle-Munning Company, Matawan, N. J., a corporation of New Jersey Application February 21, 1938, Serial No. 191,648

16 Claims. (Cl. 214—17)

My invention relates to electroprocessing machines.

It is the object of my invention to provide a machine in which one or more work carriers at the ends of one or more tanks are elevated simultaneously, adjacent work carriers are lowered simultaneously, and thereafter all carriers are moved horizontally simultaneously whether they are in their lower positions or upper positions.

It is a further object to provide an electroprocessing machine having a series of tanks adjacent to one another end to end through which the carriers are conveyed and over the ends of which the carriers must be elevated, transported horizontally, and then lowered into the next succeeding tank.

It is a further object to provide a machine in which the work carriers remain in the same relative horizontal position on the transverse moving means and merely vertically reciprocate with respect thereto.

It is a further object to provide a single motor drive which continuously operates the raising and lowering actuating means while it intermittently operates the transversely moving means.

It is an object in such a combination to also provide an elevator that raises and lowers during a part of the cycle of the continuously operating actuating means for raising and lowering and is so arranged to be disconnected therefrom during the period that the transversely moving carrier means is operating to shift the carriers laterally.

In this connection, it is understood that the elevator type conveyor machine of my invention is not to be limited to a machine for subjecting materials to electroprocesses or electrochemical processes alone, since it is obvious that my elevator-conveyor type machine may be employed in performing numerous processes not involving the use of electricity for processing the material being treated. The word "electroprocessing" as used in the specification and claims is intended to be so interpreted in light of the above explanation.

It is an object to provide a combination of this character on a central column, to one side of the tanks, so that the grease and oil from the operating mechanism will not drop into the tanks. This also provides a low construction taking the minimum of head room. In this construction the side arms move horizontally so that their outer ends always travel in vertical lines thereby making it possible to have tanks of the minimum width.

Referring to the drawings:

Figure 1 is a side elevation with the tanks partially in section showing one end of the machine and a typical arrangement of the parts. In this machine there is a single motor drive for elevating and lowering and for transverse movement.

Figure 2 is a section on the line 2—2 of Figure 1 looking in the direction of the arrows. It shows through a transverse section the arrangement of the tanks and the central standard on which the carrier and actuating mechanism are mounted.

Figure 3 is a section on the line 3—3 of Figure 2 looking in the direction of the arrows and showing diagrammatically how the pin on the elevating chain moves laterally under the shoulder on the elevator at the upper point of the stroke for movement of the elevator.

Figure 4 is taken on a similar line of Figure 2 and shows the lost motion between the continuously moving elevating chain as it passes with its pin below the elevator when the elevator is in its lowermost position and during which time the transverse conveying chains are moving the work piece supports or carriers horizontally.

Figure 5 is a side elevation of a modified form of this invention in which cranks are used for raising and lowering the elevator. Figure 5 is a dual motor type of machine in which one motor drives the carrier chains and the other motor drives the elevator mechanism.

Figure 6 is a wiring diagram showing the synchronization of the independent motors for moving the elevating mechanism and the carrier chains.

Figure 7 is a section on the line 7—7 of Figure 5 looking in the direction of the arrows.

Figure 8 is a side elevation of a machine showing an additional modification in which there is a single motor drive for driving both the elevator and the conveying chains. In this form eccentric gears are utilized for raising and lowering the elevator and permitting a dwell in connection therewith during the horizontal movement of the conveyor chains.

Figure 9 is a diagrammatic view of these gears in their elevating position.

Figure 10 is a similar view at the top of a stroke.

Figure 11 is a similar view near the bottom of the stroke just before the elevator leaves the lifting roller on a carrier.

Figure 12 is a similar view showing the elevator having passed downwardly away from the roller on the carrier to permit the carrier to be shifted laterally without being interfered with by the elevator.

Figure 14 is a diagrammatic plan view of the treating cycle which is typical of this machine.

Figure 15 is a section on the line 15—15 of Figure 1 showing the Geneva gear movement.

Figure 16 is a detailed view partially in section showing the latching mechanism in operation by which the elevator unlatches a carrier from its uppermost position on the vertical guides on which the carrier reciprocates.

Figure 17 is a section on the line 17—17 of Figure 1.

Figure 18 is a side elevation of a modified form of elevating and shifting mechanism actuated by a single motor, such actuating means making a continuous circuit.

Figure 13:
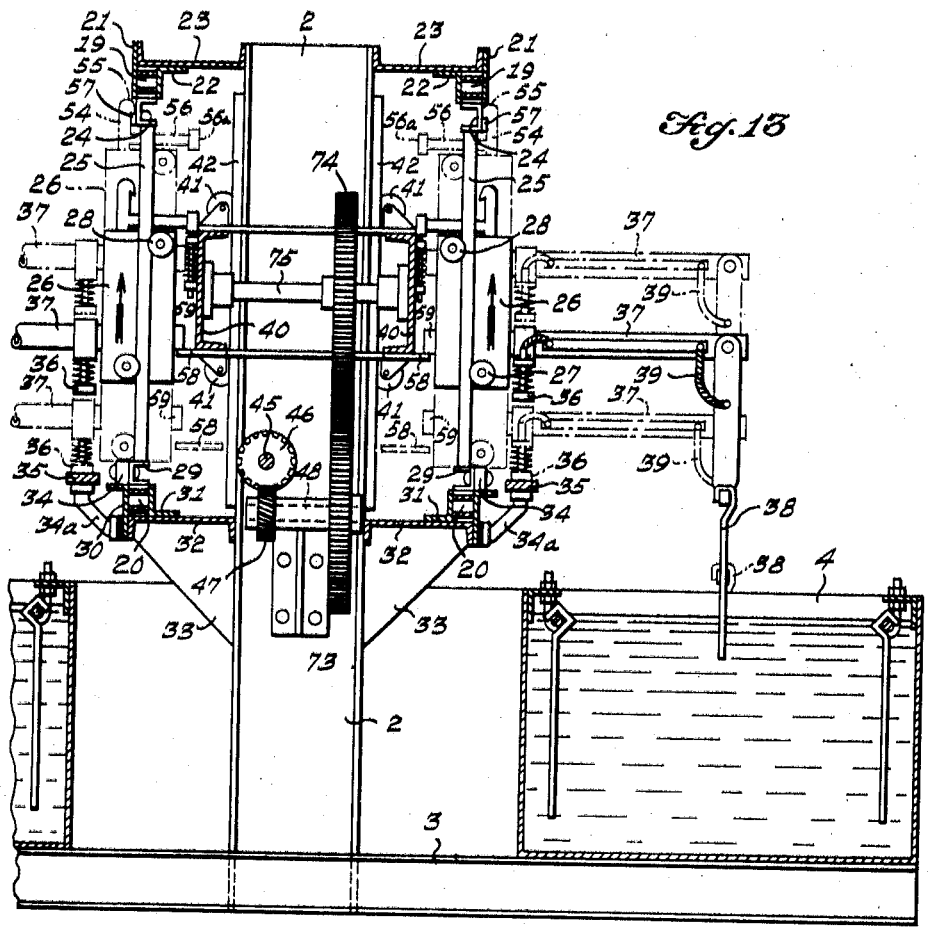
Figure 13 is a section on the line 13—13 of Figure 8.

Referring to the drawings in detail, 1 and 2 indicate a plurality of vertically disposed standards which constitute the supports for the operating mechanism hereinafter described. The bases of these standards are connected with floor beams 3 upon which rest the tanks 4, 5, etc. By referring to Figure 14, it will be seen that these tanks are arranged one after the other in succession and preferably in parallel. The exact arrangement of the tanks, the contents of the tanks and the like are matters not important in the present invention.

The standard 1 is provided with a bracket 6 for supporting the bearing 7 in which is mounted the shaft 8. The upper end of this shaft is mounted within the framework 9 upon which is mounted the single driving motor 10. This motor drives through a reduction gearing 11. The shaft driven thereby is designated 12. On this shaft is mounted the disk 13 having the pin 14 which engages with the slots 15 in the Geneva gear 16 as mounted on the shaft 8. This shaft 8 carries the sprockets 17 and 18, which respectively drive the transversely moving carrier chains 19 and 20. Chain 20 travels along adjacent the tops of the tanks 4 and 5 while the chain 19 travels adjacent the top of the machine. This top chain is guided within the tracks 21 and 22 beneath the overhead plate 23 as attached to the vertical standards 1, 2, etc. The chain is connected to the heads 24 which support the spaced guide rods 25 on which the carrier blocks 26 travel through the medium of their rollers 27 and 28 arranged on opposite sides of the rods 25. The lower ends of these rods 25 are mounted on heads 29 which are connected to the chain 20. This chain is guided between the tracks 30 and 31, which are mounted upon the shelf 32, which is in turn carried upon the brackets 33. Associated with the heads 29 are the rollers 34 which roll upon the top of the tracks 30. The brackets 34a support the contact rails 35 which are engaged by the spring pressed shoes 36 mounted upon the carrier arms 37. These carrier arms are mounted upon blocks 26 that reciprocate in the rods 25. From the ends of the arms 37 depend the racks 38 that are electrically connected by the cable 39 to the electric circuit of the electroprocessing machine.

Referring to the views in Figures 1, 2, 3 and 4 in particular, the machine is provided with elevators 40 which are horizontally disposed channel iron members extending horizontally. These channel iron members are provided with rollers 41 which travel between tracks 42 on the standards 1, 2, etc. They are moved up and down as follows.

The shaft 12 drives through the bevel gears 43 and 44 the shaft 45. This shaft has on it a series of worm gears 46, each one of which engages with the worm 47 on the shaft 48 of a sprocket 49. On this sprocket is mounted a vertically disposed chain 50. The lower end of the chain is mounted upon a sprocket 51. This chain carries a laterally projecting pin 52. This chain moves continuously. The first engages, in order to elevate the elevator 40, the underside of the angular member 53 mounted on the inside of the elevator 40. In doing so the chains 50 move the elevator upwardly while maintaining it in its horizontal position. This continues until the elevator has reached its uppermost position, whereupon the pin 52 travels along and beneath the angle iron 53 and then travels downwardly, carrying with it the elevator 40. When the elevator 40 reaches its lowermost position it becomes detached from the pin 52, as will be seen in Figure 4. The pin continues to travel with the chain 50 but out of engagement with the elevator 40 and its angle piece 53. Therefore, during this period the elevator 40 is stationary in its lowermost position.

During this period, when the elevator 40 is at rest, the Geneva gear movement has brought about the actuation of the chains 19 and 20 to impart a predetermined amount of horizontal movement to said chains. The purpose of this horizontal movement is two-fold: first, to move the immersed work racks horizontally through the solution to a new position; and, second, to move the elevated work rack and carrier over the outgoing end of the tank, to which position it has been elevated by the elevator 40, to a new position over the incoming end of the next adjacent tank preparatory to its being lowered into that tank by the next up and down movement of the elevator 40. As the chains 19 and 20 travel together and are connected by the rods 25, and as the carriers reciprocate vertically on said rods, it is apparent that all the carriers will move horizontally at the same time and the same distance, thus synchronizing the machine.

This elevation of the carrier is shown in the middle of Figure 1, the second carrier from the left, and in Figure 2. In such a position this carrier is just being elevated. When it reaches its uppermost position, the latch 54, which has a hook 55 and a weighted arm 56, engages through the hook 55 on the lug 57 mounted on the outside of the head 24. Then the elevator 40 returns to its initial position, leaving the carrier suspended in the uppermost position, as indicated in Figure 1 in the position of the third carrier from the left. It remains in this position as it is transported horizontally from the second position of the carrier, which is the second from the left, to the third position, which is the position of the carrier that is the third from the left, until the elevator 40 returns to its uppermost position. When it does so, the shoulders 58 engage with the roller 59 on the back of the carrier block 26. The spring-pressed plunger 60 carried on the elevator 40 engages with the roller 56a on the arm 56 of the latch 54. This disengages the hook 55 from the lug 57, permitting the elevator to lower the carrier to its new position over the incoming end of the next adjacent tank.

Thus it is possible through a single motor to drive synchronously in timed sequence the entire machine, both for horizontal and vertical movement of the carriers and the work pieces on the carriers. It markedly simplifies the timing of the machine.

When the elevator gets to the lower part of its downward movement, the shoulder 58 leaves the roller 59 as the carrier block 26 then rests upon the lower head 29. The carrier continues on downwardly until its rollers 41 engage the stop 41a at the bottom of the tracks 42.

With reference to Figures 5, 6 and 7, this modification employs two separate drives. The motor 10 drives through the gear box 11 the shaft 12 in the manner heretofore described. It does not drive the chains 19 and 20. This motor 10 drives through shaft 45, worm wheels 46 and worms 47 the cross shaft 48 which supports the crank disk 61. These disks are connected by pitmans 62 eccentrically pivoted on the disk 61 at one end and pivoted to the other upon the elevator 40. The action and result is substantially the same as heretofore described with respect to the elevator and the movement of the carriers.

The chains 19 and 20 are intermittently driven by the motor 63 through the gear box 64, the disk 13, pin 14 and Geneva gear 16 mounted on the shaft 8.

By reason of having two separate motors and the necessity of synchronizing them, there is provided a rotating contact carrier 65 which may be set by hand and driven by a synchronous electric clock motor 66. It carries the contacts 67, which, when engaged by the terminals 68 and 69 of the motor 10, bring that motor in circuit for its operation, and when these contacts are broken, that motor 10 stops operating. During that period, the contacts 70 are engaged by the terminals 71 and 72 connected to the motor 63, so that that motor will operate. Any desired form of synchronizing mechanism may be employed.

With reference to the modification shown in Figures 8 to 13 inclusive, this form employs a single motor drive motor 10 as described in Figures 1 to 4. Instead of the chains of Figures 1 to 4 or the disks and pitmans elevator mechanisms of Figures 5 to 7, this modification employs pairs of gears.

The gear 73 is eccentrically mounted upon the shaft 48. It meshes with a second eccentrically mounted gear 74 that is mounted on the shaft 75 on the elevator 40. The several positions of this gearing are shown in Figures 9 to 12. The gears rotate as indicated by the arrows, causing the raising and lowering of the elevator 40. The parts perform, as far as the raising and lowering and transverse movement of the carriers is concerned, in the same manner as heretofore described.

The feature of particular interest is illustrated in Figure 12 by which the elevator rests for a period at its lower position due to the disconnection between the shoulder 58 on the elevator and the roller 59 on the carrier block. During this period of disconnection, which is the dwell for the elevator, the motor is driving the chains 19 and 20 for the horizontal transfer movement.

With reference to Figure 18, which shows another form of drive for the transfer mechanism on this electroprocessing machine, the elevator 40 is raised through the following mechanism. The motor 63 driving through the gear box 64 actuates the shaft 12, pinions 43 and 44, shaft 45, worm gear 46 and worm 47. The worm 47 is mounted upon the shaft 48. This shaft carries a sprocket 48a that actuates a chain 48b. This chain carries a stud 48c that engages with the elevator 40. This stud on the chain is pivotally mounted within the channel iron forming the elevator 40. The chain 48b passes over the sprockets 48d and 48e and thence back to the sprocket 48a. The chain therefore describes a triangular path so that the pin 48c will lift the elevator 40, then move the elevator 40 transversely, and then lower the elevator 40 and at the same time return it transversely to its original position. This permits the elevator to dwell at its lower position for a short period while the pin 48c is passing in a lateral direction over the sprocket 48a. The elevator 40 is provided with a lifting plate 41a which engages with a roller 59 of the car 26. A clip 41b is mounted on the lifting plate and adapted to engage with this roller.

By this arrangement the one elevator channel 40 follows the triangular path of the driving chain while the opposite elevator channel takes a reverse path. The mode of transfer is as follows. The carrier is lifted, moved across the tank partition, and lowered without being attached to any upper transfer chain. The lifting plate 41a on the elevator engages the roller 59 at the rear of the carrier arm as in the previous forms, but this plate 41a is relatively much longer, namely, it is somewhat longer than the spacing of the arms. The clip 41b attached to one end of this plate cooperates with similar clips at transfer points to cause the horizontal movement of the transfer arms. Upon the descent of the elevator 40 along the sloping side of the driving chain, the lifting plate moves laterally under its roller, the inertia of the machine preventing such movement of the roller. The advantages of this arrangement are that one driving motor is used, there is no synchronizing device between the elevator and transfer chains, and the operation is continuous because, as the elevator is descending, it is also returning to its position where it picks up carrier arms, thus dispensing with a pause at the end of the cycle.

It will be understood that I desire to comprehend within my invention such modifications as may be clearly embraced within the claims and scope of my invention.

Having thus fully described my invention, what I claim as new and desire to secure by Letters Patent, is:

1. In a machine for conveying and subjecting materials to processing treatment, a plurality of tanks, a plurality of work piece carriers adapted to be moved along adjacent said tanks, means for supporting said carriers at different vertical positions and for transporting said carriers therealong, means for intermittently moving said carriers horizontally, means comprising an elevator for raising and lowering certain of said carriers as they are moved along through said machine, a common driving means for actuating said horizontally and vertically moving means, continuously operating means for actuating said elevator, and means connecting said continuously operating means to said elevator so that the elevator will remain stationary during its cycle of operation irrespective of the continued operation of said elevator actuating means.

2. In a machine for conveying and subjecting materials to processing treatment, a plurality of tanks, a plurality of work piece carriers adapted to support work pieces in said tanks, means for moving said carriers horizontally along through the respective tanks successively, means cooperating with said last mentioned moving means for guiding said carriers vertically without changing the horizontal position thereof with respect to said horizontal conveying means, means for elevating and lowering certain of said work piece carriers at intervals as the carriers are moved therealong, and means for alternately actuating said elevating means and said horizontal conveying means.

3. In a machine for conveying and subjecting materials to processing treatment, a plurality of tanks, a plurality of work piece carriers adapted to support work pieces in said tanks, means for moving said carriers horizontally, means for guiding said carriers vertically without changing the horizontal position thereof with respect to said horizontal conveying means, means for elevating and lowering certain of said work piece carriers at intervals as the carriers are moved therealong, means for alternately actuating said elevating means and said horizontal conveying means, said elevating means comprising an elevator and a continuously operating actuating means for said elevator, and means between said continuously moving actuating means and said elevator for connecting them so that the elevator will be raised and lowered and at the end of one of its movements remain stationary during the period that the horizontal movement of the work carriers takes place.

4. In an electroprocessing machine having a plurality of tanks in succession, carriers for work pieces, the combination of a single power driving source, spaced chains driven thereby intermittently, work piece guides and supports vertically disposed between said chains for supporting said work piece carriers, means continuously driven by said power source to raise and lower said work piece carriers, and means between said driving power means and said means for raising and lowering the work piece carriers to permit of the horizontal movement of said carriers at stated intervals.

5. In a machine for conveying and subjecting materials to processing treatment, a plurality of successive tanks, a plurality of work piece carriers, means for moving said carriers horizontally, means on said last mentioned means for guiding said carriers vertically, an elevator for raising and lowering said carriers, a continuously operating means for engaging, raising and lowering said elevator, and means therebetween for permitting said elevator to pause in its cycle of movement while its operating means continues to operate and said carriers are moved horizontally.

6. In an electroprocessing machine, a succession of tanks, a succession of work piece carriers, means of conveying said carriers horizontally, means thereon for guiding said carriers vertically, a common elevator for said carriers adapted to elevate certain of them on its upward movement and to lower others thereof on its downward movement, and continuously operating means for raising and lowering said elevator and so connected thereto to permit it to dwell in its lower position while said carriers are being moved horizontally, said elevator actuating means comprising chains, pins on said chains, and shoulders on said elevator adapted to be intermittently engaged by said pins and slidably engaged by said pins.

7. In an electroprocessing machine having a plurality of successive tanks and successive carriers, a supporting frame arranged on one side of said tanks, upper and lower chains carried in tracks on said frame, spaced tracks vertically disposed in pairs connecting said chains, means of supporting said carrier arms in rolling engagement with said tracks, lock means for locking said carriers in their uppermost position, an elevator horizontally disposed to said machine, unlocking means for unlocking said carriers at intervals on said elevator, means on said elevator for engaging said carrier arms to raise and lower them, means for intermittently actuating said chains, and means for intermittently operating said elevator.

8. In an electroprocessing machine having a plurality of successive tanks and successive carriers, a supporting frame arranged on one side of said tanks, upper and lower chains carried in tracks on said frame, spaced tracks vertically disposed in pairs connecting said chains, means of supporting said carrier arms in rolling engagement with said tracks, lock means for locking said carriers in their uppermost position, an elevator horizontally disposed to said machine, unlocking means for unlocking said carriers at intervals on said elevator, means on said elevator for engaging said carrier arms to raise and lower them, means for intermittently actuating said chains, and means for intermittently operating said elevator, said last mentioned operating means being so arranged to move continuously but only to engage said elevator a portion of each continuous cycle of its movement.

9. In an electroprocessing machine having a plurality of successive tanks and successive carriers, a supporting frame arranged on one side of said tanks, upper and lower chains carried in tracks on said frame, spaced tracks vertically disposed in pairs connecting said chains, means of supporting said carrier arms in rolling engagement with said tracks, lock means for locking said carriers in their uppermost position, an elevator horizontally disposed to said machine, unlocking means for unlocking said carriers at intervals on said elevator, means on said elevator for engaging said carrier arms to raise and lower them, means for intermittently actuating said chains, and means for intermittently operating said elevator, said last mentioned operating means being so arranged to move continuously but only to engage said elevator a portion of each continuous cycle of its movement, said means consisting of synchronously-driven spaced vertically-disposed chain loops having pins thereon intermittently engaging with said elevator.

10. In combination, in an electroprocessing machine, an elevator, spaced shoulders thereon, spaced vertically disposed chain loops having pins engaging with said shoulders, means for supporting said elevator above the lowermost position of said pin on said loop to cause the pin to become detached from said elevator during a portion of its bottom movement, said pin, chain and elevator being so arranged that the complete movement of the pin moves transversely beneath the shoulder on the elevator.

11. In an electroprocessing machine having a plurality of successive tanks and successive work piece carriers, horizontally disposed chains arranged in spaced relationship for transporting said carriers and guide rods between said chains for vertically guiding said carriers, means for intermittently driving said chains, an elevator for said carriers, and a drive for said elevator comprising an eccentrically driven pitman connection between said driving means and said elevator.

12. In an electroprocessing machine having a plurality of successive tanks and a plurality of successive work piece carriers, chain means for moving said carriers horizontally, guide means on said chain means for guiding the carriers vertically, an elevator for said carriers to raise certain of them as it rises and lower others as it descends, means to support certain of the carriers in their upper position, intermittent means for driving said chain means, and means for actuating said elevator comprising a horizontally disposed drive shaft, disks driven therefrom, eccentrically mounted pitmans on said disks and pivotally connected to said elevator at intervals whereby said elevator will rise, lower and dwell in its lower position while the carriers are being moved horizontally by the chain means.

13. In an electroprocessing machine having a plurality of successive tanks and a plurality of successive work piece carriers, chain means for moving said carriers horizontally, guide means on said chain means for guiding the carriers vertically, an elevator for said carriers to raise certain of them as it rises and lower others as it descends, means to support certain of the carriers in their upper position, intermittent means for driving said chain means, means for actuating said elevator comprising a horizontally disposed drive shaft, disks driven therefrom, eccentrically mounted pitmans on said disks and pivotally connected to said elevator at intervals whereby said elevator will rise, lower and dwell in its lower position while the carriers are being moved horizontally by the chain means, and means for synchronizing and timing the driving of the chain means and the elevator means.

14. In an electroprocessing machine having a succession of tanks and work piece carriers, chain means for moving said carriers horizontally, guide means on the chain means for guiding the carriers vertically, a horizontally arranged elevator for engaging certain of said carriers to elevate them and others to lower them, means of supporting certain of said carriers in the upper position, and means of operating said elevator and said chains so arranged as to operate the elevator means continuously and the chain means intermittently, said elevator actuating means comprising eccentrically mounted gears on said elevator and said electroprocessing machine so arranged as to raise and lower the elevator and to permit it to remain at rest for a period in its lower position while its actuating means continues to operate.

15. In an electroprocessing machine, an elevator, raising and lowering means comprising an elevator, an electroprocessing machine frame, eccentrically mounted intermeshing gears mounted upon said frame and elevator respectively, means for actuating said gears, a work piece carrier, means on said elevator for engaging with said carrier to raise and lower it during the cycle of movement of the elevator, and means to support said carrier in a position above the lowermost position of said elevator.

16. In an electroprocessing machine, an elevator, raising and lowering means comprising an elevator, an electroprocessing machine frame, eccentrically mounted intermeshing gears mounted upon said frame and elevator respectively, means for actuating said gears, a work piece carrier, means on said elevator for engaging with said carrier to raise and lower it during the cycle of movement of the elevator, means to support said carrier in a position above the lowermost position of said elevator, and means to move said carrier to a new position horizontally with respect to said elevator while it is so detached therefrom.

GUERIN TODD.